A. W. BAILEY.
PNEUMATIC TIRE TOOL.
APPLICATION FILED SEPT. 14, 1917.

1,289,603.

Patented Dec. 31, 1918.
2 SHEETS—SHEET 1.

Inventor
A. W. Bailey,
By Victor J. Evans
Attorney

Witness

UNITED STATES PATENT OFFICE.

ALBERT W. BAILEY, OF JASPER, MICHIGAN.

PNEUMATIC-TIRE TOOL.

1,289,603.

Specification of Letters Patent.   Patented Dec. 31, 1918.

Application filed September 14, 1917. Serial No. 191,464.

*To all whom it may concern:*

Be it known that I, ALBERT W. BAILEY, a citizen of the United States, residing at Jasper, in the county of Lenawee and State of Michigan, have invented new and useful Improvements in Pneumatic-Tire Tools, of which the following is a specification.

This invention relates to pneumatic tire tools, the object in view being to produce a particularly effective, reliable and quick acting tool by means of which the outer casing of a pneumatic tire of the clencher type may be quickly removed from the rim of a vehicle wheel, the tire tool being also useful for the purpose of replacing the tire on the wheel rim.

With the above and other objects in view, the invention consists in the novel construction, combination and arrangement of parts, herein fully described, illustrated and claimed.

In the accompanying drawings:—

Figure 6:
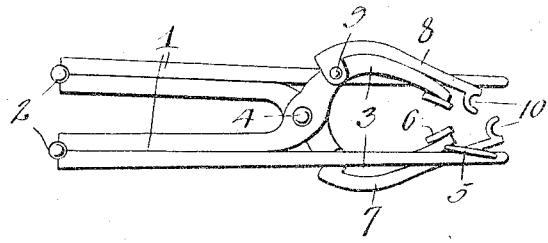
Fig. 6 is a plan view of the tool in its fully folded position.

The improved tool comprises a pair of hand levers 1 each of which is provided between the ends thereof with a pivot joint 2 adapting the tool to be compactly folded as shown in Fig. 6 in order that it may be placed in a tool box or other small compartment of a motor vehicle.

Figure 3:
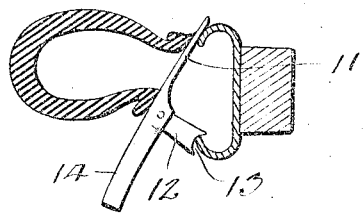
Fig. 3 is an enlarged fragmentary section on the line 3—3 of Fig. 1.

The levers 1 are provided with arcuate tire compressing jaws 3 and between the jaws 3 and the levers 1, the latter are crossed and connected together by a pivot 4. Under such an arrangement, as the levers 1 are moved toward each other, the jaws 3 are closed upon the tire so as to press the beaded or clencher portions of the outer casing inwardly out of engagement with the clencher flanges of the rim of the vehicle wheel. When the levers 1 are moved into close relation to each other they are temporarily held in such position by means of a pivoted loop or yoke 5 carried by one of the levers 1 and adapted to be passed over the end of the other lever as shown in Fig. 3. Each of the jaws 3 carries adjacent to the end thereof a laterally extended bearing plate or shoe 6 which prevents injury to the side walls of the tire casing.

Associated with the jaws 3 are jack arms 7 and 8. Each of said arms is connected to one of the jaws 3 by means of a pivot 9 and has adjacent to the free extremity thereof a lip or hook 10. It will be observed that one of said arms 8 is longer than the other arm so that the hook or lip 10 thereof may be positioned at a greater distance from the pivot 4 than the other lip or hook.

In conjunction with the tool hereinabove described, I employ a lever or rest 14 adapted to be inserted between the rim and the tire at one side of the latter. Said rest comprises a tire supporting portion 11, and a prop 12 formed in the lower extremity thereof with a notch 13 adapted to engage the clencher flange of the vehicle rim.

Figure 1:
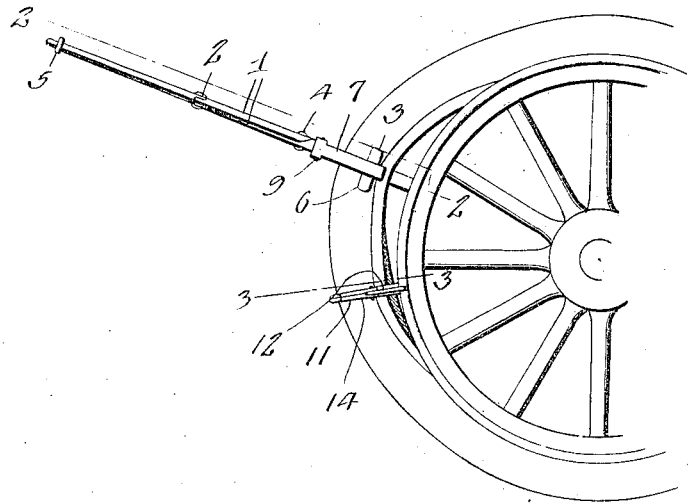
Figure 1 is a side elevation of a portion of a vehicle wheel and pneumatic tire, showing the improved tire tool in its applied relation thereto.
Figure 4:
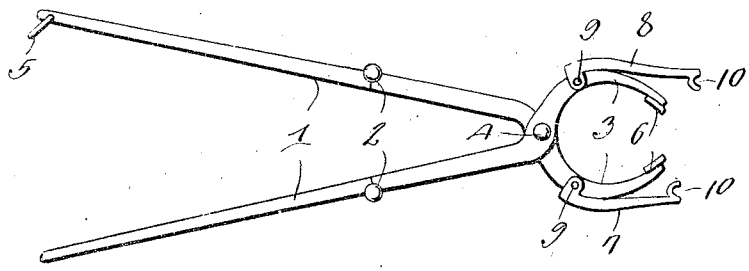
Fig. 4 is a plan view of the tool detached.
Figure 5:
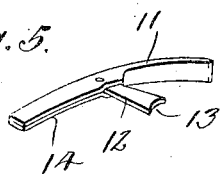
Fig. 5 is a detail perspective view of the prop or spreader.
Figure 2:
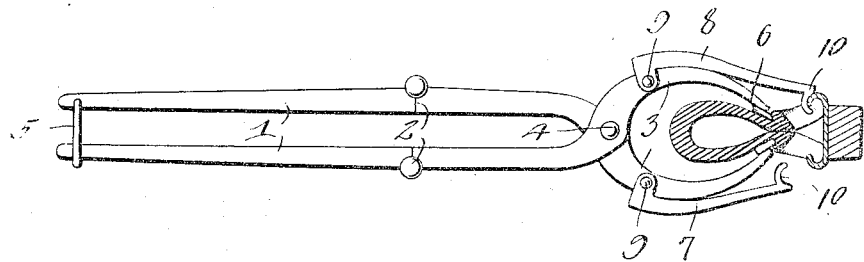
Fig. 2 is an enlarged fragmentary section on the line 2—2 of Fig. 1.

The operation of the tool may be described as follows. The tool is applied to the outer casing of the tire so that the extremities of the jaws 3 will closely approach the vehicle rim. The levers 1 are then moved toward each other and the loop or yoke 5 is slipped over the ends of the levers to hold them in a position in which the jaws 3 are compressing the side walls of the tire, said jaws serving to press the clencher beads of the tire inwardly out from under the clencher flanges of the wheel rim. The two handles or levers 1 are now grasped and moved laterally to one side of the rim until the lip or hook 10 of the shorter arm 8 engages the adjacent side flange of the rim. The handles or levers 1 are then moved in the opposite direction until the lip or hook 10 of the longer arm 8 is brought into engagement with the flange at the opposite side of the rim. This results in drawing a portion of the tire radially outward from the rim to the position illustrated in Fig. 1. The prop or rest 11 is now inserted between the rim and tire close to the tool. The tool is then released from the tire and again brought into engagement with the tire at a point 8 or 10 inches from the previous position. The tire may now be readily removed from the rim. The tire may be replaced on the rim by a mere reversal of the operation hereinabove described. Actual tests have demonstrated that a tire may be removed from a vehicle wheel rim in less time than it requires to describe said operation.

I claim:—

In a tire tool, the combination of a pair of hand levers, oppositely arranged jaws carried by said levers and adapted to press the side walls of a tire inwardly from under the clencher flanges of a tire carrying rim, and oppositely arranged arms pivotally connected to said jaws and provided adjacent to the free ends thereof with rim engaging hooks, said arms being of unequal length and the hooks thereof being located at different distances from the pivotal connection of said levers.

In testimony whereof I affix my signature.

ALBERT W. BAILEY.